United States Patent
André et al.

(10) Patent No.: US 9,240,258 B2
(45) Date of Patent: *Jan. 19, 2016

(54) DISPERSION COMPRISING METALLIC, METAL OXIDE OR METAL PRECURSOR NANOPARTICLES, A POLYMERIC DISPERSANT AND A THERMALLY CLEAVABLE AGENT

(71) Applicant: AGFA-GEVAERT, Mortsel (BE)

(72) Inventors: Xavier André, Mortsel (BE); Dirk Bollen, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 82 days.

This patent is subject to a terminal disclaimer.

(21) Appl. No.: 14/363,336

(22) PCT Filed: Dec. 17, 2012

(86) PCT No.: PCT/EP2012/075691
§ 371 (c)(1),
(2) Date: Jun. 6, 2014

(87) PCT Pub. No.: WO2013/092450
PCT Pub. Date: Jun. 27, 2013

(65) Prior Publication Data
US 2015/0017405 A1    Jan. 15, 2015

Related U.S. Application Data

(60) Provisional application No. 61/578,894, filed on Dec. 22, 2011.

(30) Foreign Application Priority Data

Dec. 21, 2011   (EP) ..................................... 11194791

(51) Int. Cl.
| | | |
|---|---|---|
| *H01B 1/22* | (2006.01) | |
| *C08K 5/09* | (2006.01) | |
| *C08K 5/092* | (2006.01) | |
| *C09D 11/52* | (2014.01) | |
| *B05D 5/12* | (2006.01) | |
| *C09D 7/12* | (2006.01) | |
| *C09D 5/24* | (2006.01) | |

(52) U.S. Cl.
CPC .. *H01B 1/22* (2013.01); *B05D 5/12* (2013.01); *C08K 5/09* (2013.01); *C08K 5/092* (2013.01); *C09D 7/1266* (2013.01); *C09D 11/52* (2013.01); *C09D 5/24* (2013.01); *Y10T 428/24893* (2015.01); *Y10T 428/24909* (2015.01)

(58) Field of Classification Search
CPC .............. H01B 1/02; H01B 1/20; H01B 1/22; C09D 11/03; C09D 11/30; C09D 11/326; C09D 11/52; C08K 5/09; C08K 5/092; C08K 5/095; C08L 71/00; C08L 59/00
See application file for complete search history.

(56) References Cited

U.S. PATENT DOCUMENTS

| | | | |
|---|---|---|---|
| 4,896,250 A | 1/1990 | Sullivan | |
| 2007/0154644 A1 | 7/2007 | Hwang et al. | |
| 2009/0242854 A1* | 10/2009 | Li ........................ | C09D 11/101 252/519.33 |
| 2009/0321689 A1 | 12/2009 | Harada et al. | |
| 2010/0040846 A1* | 2/2010 | Bahnmuller ........... | C09D 11/52 428/208 |
| 2010/0059260 A1 | 3/2010 | Takemoto et al. | |

FOREIGN PATENT DOCUMENTS

| | | | |
|---|---|---|---|
| EP | 1 887 056 A1 | 2/2008 | |
| EP | 2 050 792 A1 | 4/2009 | |
| EP | 2 147 733 A1 | 1/2010 | |
| EP | 2 468 827 A1 | 6/2012 | |
| GB | 2479412 A * | 10/2011 | ............... C09D 5/24 |
| JP | 02-126511 A | 5/1990 | |
| JP | 2009074171 A * | 4/2009 | |
| WO | 2006/072959 A1 | 7/2006 | |
| WO | 2008/021472 A2 | 2/2008 | |
| WO | 2008/038867 A1 | 4/2008 | |
| WO | 2011/052966 A2 | 5/2011 | |

OTHER PUBLICATIONS

Official Communication issued in International Patent Application No. PCT/JP2012/075691, mailed on Apr. 16, 2013.
André et al., "A Dispersion Comprising Metallic, Metal Oxide or Metal Precursor Nanoparticles, A Polymeric Dispersant and a Sintering Additive", U.S. Appl. No. 14/363,338, filed Jun. 6, 2014.
André et al., "Dispersion Comprising Metallic, Metal Oxide or Metal Precursor Nanoparticles", U.S. Appl. No. 13/996,399, filed Sep. 25, 2013.
Andre et. al.; "A Metallic Nanoparticle Dispersion"; U.S. Appl. No. 14/405,207, filed Dec. 3, 2014.

* cited by examiner

*Primary Examiner* — Mark Kopec
*Assistant Examiner* — Matthew R Diaz
(74) *Attorney, Agent, or Firm* — Keating and Bennett, LLP

(57) ABSTRACT

A dispersion includes metallic, metal oxide, or metal precursor nanoparticles; a thermally cleavable polymeric dispersant; an optional dispersion medium; and a thermally cleavable agent. Pastes, coated layers, and patterns may contain the dispersion. A method for producing the specific thermally cleavable dispersant and for producing the metallic nanoparticle dispersions. The dispersions allow the reduction or avoidance of organic residue in coated layers and patterns on substrates, the use substrates of low thermal resistance, and faster processing times.

12 Claims, No Drawings

DISPERSION COMPRISING METALLIC, METAL OXIDE OR METAL PRECURSOR NANOPARTICLES, A POLYMERIC DISPERSANT AND A THERMALLY CLEAVABLE AGENT

CROSS-REFERENCE TO RELATED APPLICATIONS

This application is a 371 National Stage Application of PCT/EP2012/075691, filed Dec. 17, 2012. This application claims the benefit of U.S. Provisional Application No. 61/578,894, filed Dec. 22, 2011, which is incorporated by reference herein in its entirety. In addition, this application claims the benefit of European Application No. 11194791.7, filed Dec. 21, 2011, which is also incorporated by reference herein in its entirety.

BACKGROUND OF THE INVENTION

1. Field of the Invention

The present invention relates to a dispersion comprising a) metallic, metal oxide, metal precursor nanoparticles, b) a polymeric dispersant (PD) comprising (i) a polyacetal or a polyacetal/polyether backbone, and (ii) an anchor group with affinity for the metallic, metal oxide or metal precursor nanoparticles that is chemically bonded to the polyacetal or polyacetal/polyether backbone, the PD having 95 wt. % decomposition at a temperature below 300° C., c) an optional dispersion medium, and d) a thermally cleavable agent (TCA), characterized in that the TCA is Brönsted acid having a pKa below 4.4 and a boiling point of 100° C. or higher

2. Description of the Related Art

The interest in metallic nanoparticles has increased during the last decades due to their unique properties when compared to the bulk properties of a given metal. For example, the melting point of metal nanoparticles decreases with decreasing particle size making them of interest for printed electronics, electrochemical, optical, magnetic and biological applications.

The production of stable and concentrated metallic nanodispersions that can be coated or printed, for example by inkjet printing, with a high throughput is of great interest as it enables the preparation of electronic devices at low costs.

Usually, the production of metallic nanodispersions is carried out in water or organic solvents by the polyol synthesis methodology (as disclosed in Mat. Chem. Phys. 114, 549-555), by a derivative of the polyol synthesis methodology, or by an in-situ reduction of metallic salts in the presence of various reducing agents. Such methods are disclosed in for example US2010143591, US2009142482, US20060264518 and US20080220155, EP-As 2147733, 2139007, 803551, 2012952, 2030706, 1683592, 166617, 2119747, 2087490 and 2010314, WOs 2008/151066, 2006/076603, 2009/152388 and 2009/157393.

Among others, the dilution of metallic nanodispersions, usually less than 1 wt. % of metallic particles, is a severe drawback. Indeed, such highly diluted metallic nanodispersions cannot directly be used to prepare a conductive coating or a printing fluid that requires at least 5 wt. % of metallic nanoparticles based on its composition. An additional concentration step of the diluted metallic nanodispersions is then necessary before it can be used in the preparation of such coating or printing fluids.

WO2006/072959 discloses the production of silver nanoparticles dispersions up to 35 wt. % in water but the method still requires additional purification and isolation steps that impart drastically their industrialization and the scope of their applications.

A metallic nanodispersion typically comprises metallic, metal oxide or metal precursor nanoparticles, a polymeric dispersant and optionally a dispersion medium. The polymeric dispersant is a substance that promotes the formation and stabilization of a dispersion of particles in a dispersion medium. Dispersed particles may have a tendency to re-agglomerate after the dispersing operation, due to mutual attraction forces. The use of dispersants counteracts this re-agglomeration tendency of the particles. The dispersant has to meet particularly high requirements when used for coating fluids and printing inks. Non-stable dispersions may lead to irreversible phase separation causing among other the clogging of the coating or print heads, which are usually only a few micrometers in diameter. In addition, metallic particles agglomeration and the associated blockage of the coating/print heads has to be avoided in the standby periods of the system.

In the case of metallic nanoparticles dispersions, their tendency to re-agglomerate, to flocculate or to precipitate (leading to phase separation) is enhanced due to their high bulk density ($\rho$) when compared to other organic or inorganic particles like organic pigments ($\rho=1.2$-$2.0$ g/cm$^3$), inorganic pigments ($\rho=4.2$ g/cm$^3$ for titanium dioxide) or inorganic filler ($\rho=4.4$ g/cm$^3$ for barium sulphate). For example, the bulk densities at room temperature of silver, cupper and gold are respectively 10.49, 8.94 and 19.30 g/cm$^3$.

Polymeric dispersants typically contain in one part of the molecule so-called anchor groups, which adsorb onto the metallic particles to be dispersed. In a spatially separate part of the molecule, polymeric dispersants have polymer chains compatible with the dispersion medium (or liquid vehicle) and all the ingredients present in the final coating or printing fluids. Typical polymeric dispersants include homopolymer or random or block copolymers of various topologies and architectures (linear, graft, hyper branched).

Metallic nanoparticles dispersions usually comprise polymeric dispersants selected from homopolymers and copolymers based on acrylic acid, methacrylic acid, vinyl pyrrolidinone, vinyl butyral, vinyl acetate or vinyl alcohol.

EP-A 2147733 discloses a method for producing a silver ink from a dispersion containing a polymeric dispersant, the dispersant comprising a hydrophilic segment and a polyalkyleneimine chain.

US2009/0242854 describes compounds to improve the stability of metallic conductive inks, which comprise metallic nanoparticles, a polymeric dispersant and a solvent, wherein the respective boiling point may be less than 150° C. The polymers may have a head group and a tail group on a nanoparticle, wherein the head group may include compounds such as amines, cationic alkylammonium groups, carboxylic acids, sulfonic acids and phosphoric acid groups. Other additives may also be present in the dispersion, such as dimethyl sulfoxide and oxy-bis-ethanol. Compounds such as BYK-349, BYK-DYNWET800, isostearyl ethylimidazolinium ethosulphate and alcohols were added to some of the inks to promote good wetting properties and adhesion properties.

EP-A 10196244.7 (filed on 21-12-2010) describes a conductive ink comprising metallic nanoparticles and a polymeric dispersant which comprises an anchor group with affinity for the metallic nanoparticles, wherein the polymeric backbone has a 95 wt. % decomposition at a temperature below 300° C., thus allowing to be used in printing processes with lower curing temperatures.

The metallic nanodispersions are used to coat or print metallic patterns on a substrate. Typically, after applying the patterns on the substrate a sintering step, also referred to as curing step, at elevated temperatures is carried out to induce/enhance the conductive or the semi-conductive properties.

It has been found that the organic components of the nanodispersions, for example the polymeric dispersants, may reduce the sintering efficiency and thus the conductive or semi-conductive properties of a coated or printed surface. For this reason, higher sintering temperatures and longer sintering times are often required to decompose the organic components.

Typical polymeric dispersants, such as those described above, are characterized by a full decomposition temperature of at least 350° C. Therefore, the patterns coated or printed with the fluids or inks comprising such polymeric dispersants require a sintering step at elevated temperatures to be sure that most of the organic components in the coated or printed layers are decomposed.

Such high sintering temperatures are not compatible with common polymer foils, such as polyethylene terephthalate (PET) or polycarbonate, which have relatively low glass transition temperatures. This restricts the choice to more expensive polymers such as polyimide.

In order to enlarge the application of metallic, metal oxide or metal precursor nanoparticles dispersion to thermo-sensitive substrates it is desirable to obtain metallic, metal oxide or metal precursor compositions which require lower temperatures and times for the curing step, with good or improved conductivity values. Additionally, it is also desirable to develop a curing process to take advantage of the improved properties of the compositions, i.e. a high throughput coating or printing process.

SUMMARY OF THE INVENTION

Preferred embodiments of the present invention provide metallic dispersions that allow a reduction of the curing time and/or a lowering of the curing temperature thereby minimizing the amount of organic residue in a coated layer or printed pattern of such dispersions on a substrate.

A preferred embodiment of the present invention is realised by providing dispersions comprising metallic, metal oxide or metal precursor nanoparticles, a thermally cleavable polymeric dispersant, a thermally cleavable agent and optionally a dispersion medium, as defined below.

Another preferred embodiment of the present invention provides a process for making such metallic nanoparticles dispersions of high concentration and high stability that avoids additional purification and/or isolation procedures.

These advantages and benefits are realised by providing a process for making the dispersions by providing a thermally cleavable polymeric dispersant and adding some specific compounds (thermally cleavable agents) to the dispersant.

Another preferred embodiment of the present invention provides thermally cleavable polymeric dispersants that reduce the curing times and/or lower the curing temperatures, resulting in avoiding or reducing the organic residues in the coated layers or printed patterns on a substrate.

These advantages and benefits are realised by providing a process for making the polymeric dispersant by providing specific polymeric dispersants comprising a backbone that can be thermally cleaved at T<300° C. and metal anchoring groups and by adding specific compounds, as thermally cleavable agents to the dispersant.

A further preferred embodiment of the present invention provides a process for making the coated layers or printed patterns with the dispersions of the present invention that use lower temperatures and reduced times.

Further advantages and embodiments of the present invention will become apparent from the following description and the dependent claims.

DETAILED DESCRIPTION OF THE PREFERRED EMBODIMENTS

The present invention relates to thermally cleavable polymeric dispersants, metallic nanoparticles dispersions and to processes to make them and to pastes, coated layers and patterns comprising the dispersions.

1. Metallic, Metal Oxide or Metal Precursor Nanoparticles

A dispersion according to a preferred embodiment of the present invention comprises metallic nanoparticles, metal oxide nanoparticles or metal precursor nanoparticles.

The metallic nanoparticles comprise one or more metals in elemental or alloy form. The metal is preferably selected from the group consisting of silver, gold, copper, nickel, cobalt, molybdenum, palladium, platinum, indium, tin, zinc, titanium, chromium, tantalum, tungsten, iron, rhodium, iridium, ruthenium, osmium, aluminium and lead. Metallic nanoparticles based on silver, copper, molybdenum, aluminium, gold, or a combination thereof, are particularly preferred.

Other preferred nanoparticles are based on Cupper Indium Gallium or Cupper Indium Gallium Selenide (CIGS). Other preferred nanoparticles, are based on selenides or sulfides, such as for example CdS, CdSe, ZnS, ZnSe, PbS, PbSe, CdTe, CdTeSe or PbSe may also be used.

Preferred metal oxide nanoparticles are based on indium oxide, indium tin oxide, tin oxide, titanium oxide, zirconium oxide, wolfram oxide, molybdenum oxide, cadmium oxide or zinc oxide. Also doped metal oxide nanoparticles such as $ZnO{:}Al$, $SnO_2{:}F$ or $SnO_2{:}Sb$ may be used. Cupper Indium Gallium oxides and cupper oxides may also be used as precursors for Cupper Indium Gallium Selenide nanoparticles.

The term "precursor" refers to the ability of converting it to the desired material by means of an additional step such as the reduction of metal oxides to metals or the selenization of Cupper Indium Gallium to CIGS.

The term "nanoparticles" refers to dispersed particles having an average particle size below 100 nm at the end of the dispersion preparation. The metallic, metal oxide or metal precursor nanoparticles have an average particle size at the end of the dispersion preparation of less than 100 nm, preferably less than 50 nm, more preferably less than 20 nm.

Before the dispersion preparation step, the metal, metal precursor or metal oxide particles are typically available as powders or flakes with an average particle size often above 100 nm. Their particle size must then be lowered to the nanoparticles range during the dispersion preparation.

2. Polymeric Dispersant

A dispersant according to a preferred embodiment of the present invention comprises a matrixophilic polymer backbone part, which confers the steric stabilization in the dispersion medium, and anchor groups with affinity for the metallic, metal oxide or metal precursor nanoparticles that are chemically bonded, preferably covalently bonded, to the polymer backbone. The anchor groups ensure optimal stabilization of the nanoparticles.

The polymer backbone has to ensure a 95 wt. % thermal decomposition of the polymeric dispersant at a temperature preferably below 300° C. For that reason, the polymer backbone is a polyacetal backbone or a polyacetal/polyether backbone.

The polymeric dispersant has complete decomposition at a temperature below 310° C. and a 95 wt. % decomposition at a temperature below 300° C., preferably below 290° C., more preferably below 280° C., as measured by Thermal Gravimetric Analysis (TGA).

A 95 wt. % decomposition means that 95 wt. % of the polymeric dispersant is decomposed and evaporates from the coated or printed layers.

The thermal decomposition may occur in 1, 2 or 3 steps. The main decomposition, i.e. at which at least 75 wt. % of the polymeric dispersant is decomposed, preferably occurs between 100° C. and 300° C., more preferably between 125° C. and 250° C., most preferably between 150° C. and 240° C. Typically, a derivative weight loss curve is used to derive the temperature at which the main decomposition occurs. The highest peak in such a derivative weight loss curve, i.e. the main decomposition, is observed preferably between 100° C. and 300° C., more preferably between 125° C. and 250° C., most preferably between 150° C. and 240° C.

As aromatic polyethers have a higher thermal stability compared to aliphatic polyethers, the polyether fragment of the polymeric backbone of the dispersant preferably comprise no, or only a minor amount of aromatic groups.

Particularly preferred, the polyether fragment of the polymeric backbone of the dispersant is an aliphatic polyether backbone.

Examples of preferred polyacetal backbones have the following structures or can be combination thereof, produced by the polymerization or copolymerization of cyclic acetal monomers, such as trioxane, dioxolane, and dioxepane.

—(CH$_2$—O)$_n$—
—(CH$_2$—CH$_2$—O—CH$_2$—O)$_n$—
—(CH$_2$—CH$_2$—CH$_2$—O—CH$_2$—O)$_n$—
—(CH$_2$—CH$_2$—CH$_2$—CH$_2$—O—CH$_2$—O)$_n$— wherein n is an integer between 14 and 500.

Examples of preferred polyether fragments for including in the polyacetal backbone have the following structures, —(CH$_2$—CH$_2$—O)$_n$—
—(CH$_2$—CHCH$_3$—O)$_n$—
—(CH$_2$—CH$_2$—CH$_2$—O)$_n$—
—(CH$_2$—CH$_2$—CH$_2$—CH$_2$—CH$_2$—CH$_2$—O)$_n$— wherein is n is an integer between 14 and 500.

A particularly preferred polyacetal or polyacetal/polyether backbone is represented by Formula I,

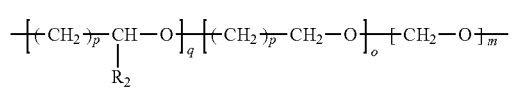

Formula I wherein
m is an integer between 1 and 500,
o is an integer between 0 and 340,
q is an integer between 0 and 250,
p is an integer between 1 and 7;
m+o+q is an integer between 14 and 500;
R$_2$ represents a hydrogen, a methyl or an optionally substituted alkyl group.

3. Anchoring Groups

Anchor groups for the metallic, metal precursor and metal oxide nanoparticles may comprise low molecular weight (MW<300) aliphatic amines or aromatic amines, thioethers, thiols, disulfides, optionally substituted aryl or aralkyl groups, 2-pyrrolidone, amide, ester, acrylic, S-containing heteroaromatic compounds, N-containing heteroaromatic compounds, optionally substituted thiiranes, thioacetals, oxathioacetals, sultams, thiophenes, benzothiophenes, cyclic and alicyclic amines, lactams, imidazolidones, oxazolidinones, hydantoins, urazoles, 2H-azirines, 3-pyrrolines, 2-pyrrolines, 1-pyrrolines, maleimides, 2-isoxazolines, 2-oxazolines, 2-imidazolines, pyrazolines, pyrroles, imidazoles, benzimidazoles, pyrazoles, indazoles, 1,2,3-triazoles, 1,2,3-benzotriazoles, 1,2,4-triazoles, tetrazoles, 1-substituted tetrazoles, 5-substituted tetrazoles, 1,5-disubstituted tetrazoles, optionally substituted imidazol-2-ones, benzimidazol-2-ones, 1,3-oxazoles, benzoxazoles, isoxazoles, 1,3-thiazoles, benzothiazoles, 1,3,4-oxadiazoles, 1,2,4-oxadiazoles, 1,3,4-thia-diazoles, indoles, oxindoles, indolines, carbazoles, azaindoles, isoindoles, indolizines, indolizinones, pyridines, dihydropyridines, 2-pyridones, pyrimidines, 1,3,5-triazines, quinolines, tetrahydroquinolines, 1,2-dihydroquinolines, isoquinolines, 3,4-dihydroisoquinolines, 1,8-napthyridines, quinazolines, 4-quinolones, 1,3-imidazoles, thioamides, morpholine derivatives, piperazine, triazaindolizines, or nucleic acid derivatives such as adenine, guanine, cytosine, thymine, uracile, or a combination thereof.

Preferably, the anchor groups comprise a S and/or N containing heteroaryl.

More preferably, the anchor groups are selected from the group of heteroaryls according to Formulae II, III, IV or V.

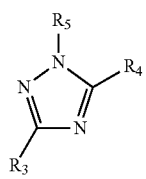

Formula II

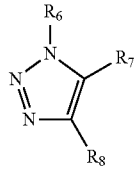

Formula III

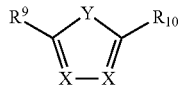

Formula IV

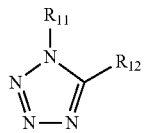

Formula V wherein
R$_3$, R$_4$, R$_7$, R$_8$, R$_9$, R$_{10}$, and R$_{12}$ independently represent a halogen, an optionally substituted thiol, an hydroxyl, a carboxylic acid, an aldehyde, an ester, an amide, a primary amine, a secondary amine, a tertiary amine, an optionally substituted alkyl, aryl, aralkyl or alkylene group;
R$_7$ and R$_8$ can be optionally linked and form a ring structure;
R$_5$, R$_6$, R$_{11}$ represent independently a halogen, an optionally substituted thiol, a carboxylic acid, a primary amine, a secondary amine, a tertiary amine, an optionally substituted alkyl, aryl or aralkyl group;

X independently represents a —N—, a —CH—, or a —C(CR$_{13}$)— and where R$_{13}$ represents a methyl, an optionally substituted alkyl, aryl or aralkyl group and where X can optionally be linked to R$_9$ or R$_{10}$ and form a ring structure;

Y represents oxygen, sulphur, or —NR$_{14}$— wherein R$_{14}$ represents a methyl or an optionally substituted alkyl, aryl or aralkyl group.

Particularly preferred anchor groups include 2,5-dimercapto-1,3,4-thiadiazole, 1-(2-dimethylamino-ethyl)-5-mercapto-tetrazole, 5-mercapto-1-methyltetrazole, 3-amino-5-mercapto-1,2,4-triazole and 1-(2-dimethylamino-ethyl)-5-mercapto-tetrazole.

The polymeric dispersants according to a preferred embodiment of the present invention are preferably produced by any of the following methods:
- a ring-opening polymerization, a ring-opening copolymerization or any other polymerization or copolymerization of cyclic acetals or oxiranes in the presence of the anchor group;
- a post-functionalization of a polyacetal or polyacetal/polyether precursor by post-polymerization procedures including the quenching or derivatization with the anchor group molecules or any molecule bearing the anchor group moiety, as described in Macromol. Symp. 1994, 85, 167-174.

When carrying out the polymerization in the presence of the anchor group, the first method described above, the anchor groups may be chemically bonded to one or both ends (i.e. the telechelic positions) of the polymeric backbone or may be incorporated into the polymeric backbone. When carrying out a post-functionalization, the second method described above, the anchor groups will preferably be chemically bonded to one or both ends of the polymeric backbone.

The anchor groups according to Formulae II to V may be chemically bonded to the polymer backbone through for example the N-atoms of the heterocycles or the R$_3$ to R$_{12}$ substituents.

A particularly preferred polymeric dispersant comprises an anchor group with affinity for metallic, metal oxide or metal precursor nanoparticles according to Formula II, III, IV or V, or a combination thereof, that is chemically bonded to a polymeric backbone according to Formula I.

Preferably, this particularly preferred polymeric dispersant is prepared by a reaction between:
a) 90 to 99.4 mol % of a monomer represented by Formula VI, VII or VIII, or a combination thereof;

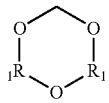
Formula VI

Formula VII

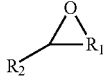
Formula VIII wherein
R$_1$ represents a (CH$_2$)$_p$ unit with p is an integer between 1 and 7 and R$_2$ represents an hydrogen, a methyl or an optionally substituted alkyl group;

b) 0.1 to 10 mol % of a metallic anchor group according Formula II, III, IV or V, or a combination thereof;
c) 0.1 to 0.5 mol % of a polymerization initiator selected from the groups consisting of a proton acid, a Lewis acid and an oxonium compound, or of an anionic initiator selected from the group consisting of an alcoholate and an organanometallic compound.

The mol % referred to above is based on the feed mixture.

Suitable polymerization initiators are trifluoromethanesulphonic acid, methanesulphonic acid, perchloric acid, acetic anhydride, boron trifluoride etherate, boron trifluoride methyl etherate, boron trifluoride diethyl etherate, boron trifluoride dibutyl etherate, boron trifluoride methyl tert-butyl etherate, triethyloxonium tetrafluoroborate, triethyloxonium hexachloroantimonate, triethyloxonium hexafluorophosphate, antimony salts such as antimony chloride, diethylaluminum chloride, ethyl aluminum dichloride, trialkyl aluminum, metal halides such as aluminum chloride, zinc chloride, titanium tetrachloride, sodium alkoxide, potassium alkoxide, alkyl or aryl lithium, alkyl or aryl sodium, alkyl or aryl potassium, alkyl magnesium bromide, sodium naphthalene, aluminum alkoxide, magnesium alkoxide, beryllium alkoxide, or ferric alkoxide.

The polymeric dispersant according to a preferred embodiment of the present invention has an average numerical molecular weight Mn of less than 15000 Da, more preferably less than 8000 Da. In an even more preferred embodiment, the average numerical molecular weight Mn is comprised between 1500 and 6000 Da.

Upon completion of the reaction described above, free anchor groups, i.e. anchor groups that are not chemically bonded to the polymer backbone, may be present in the resulting reaction product. Such a reaction product, i.e. polymeric dispersant according to a preferred embodiment of the present invention and free anchor groups may be used as such to prepare the nanodispersions when the amount of free anchor groups is not too high.

In a preferred embodiment less than 10 mol % of free anchor groups is present in the reaction product.

4. Dispersion Media

A dispersion medium used in the metallic nanoparticles dispersion of the present invention is absent or is preferably a non-aqueous liquid. A non-aqueous liquid may comprise minor amounts of water, for example less than 10 wt %, more preferably less than 5 wt %. The dispersion medium may consist of an organic solvent or a combination of organic solvents. Suitable organic solvents include alcohols, aromatic hydrocarbons, ketones, esters, aliphatic hydrocarbons, higher fatty acids, carbitols, cellosolves, and higher fatty acid esters. Suitable alcohols include methanol, ethanol, propanol and 1-butanol, 1-pentanol, 2-butanol, t-butanol. Suitable aromatic hydrocarbons include toluene, and xylene. Suitable ketones include methyl ethyl ketone, methyl isobutyl ketone, 2,4-pentanedione and hexa-fluoroacetone. Also glycol, glycolethers, N-methylpyrrolidone, N,N-dimethylacetamid, N,N-dimethylformamid may be used. In a preferred embodiment, the use of 1-methoxy-2-propanol, methanol, ethanol and isopropanol is particularly preferred. In another preferred embodiment, the metallic nanoparticles dispersion can be solvent-free and is a homogeneous viscous paste.

5. Thermally Cleavable Agent

A metallic dispersion according to a preferred embodiment of the present invention comprises thermally cleavable agents (TCA).

The thermally cleavable agents according to a preferred embodiment of the present invention are Brönsted acids having a pKa below 4.4 and a boiling point of 100° C. or higher, preferably higher than 110° C., and
  (i) the TCA is an aliphatic carboxylic acid, according to the formula R—[COOH]n, where R is either absent or an optionally substituted alkyl or alkenyl group and n is an integer equal or higher than 1, or
  (ii) the TCA is a sulphonic acid, according to the formula R'—$SO_3H$ wherein R' is an optionally substituted alkyl or aryl group.

The thermally cleavable agents according to a preferred embodiment of the present invention are preferably directly soluble in the dispersion medium or in the dispersion media. If the thermally cleavable agents are not directly soluble, they should be solubilized firstly in a polar organic medium that is compatible with the dispersion medium or media. Examples of such polar organic solvents are alcohols. The polar organic medium wherein the TCA is solubilized is than added to the dispersion medium.

In one preferred embodiment, the TCA is an aliphatic carboxylic acid comprising one to three carboxylic acid functions having the formula R—[COOH]n, where R is either absent or an optionally substituted alkyl or alkylene group, and n is 1, 2 or 3.

Examples of aliphatic monocarboxylic acids within the scope of preferred embodiments of the present invention are gluconic acid, lactic acid, pyruvic acid, and glyoxylic acid.

Examples of aliphatic dicarboxylic acids are oxalic acid (HOOC—COOH) and derivatives thereof, tartaric acid (HOOC—CHOH—CHOH—COOH) and derivatives thereof.

Examples of aliphatic tricarboxylic acids are citric acid and derivatives thereof, propane tricarboxylic acid and derivatives thereof.

In another preferred embodiment, the TCA is a sulphonic acid with the formula R'—$SO_3H$, where R' is a substituted or non-substituted aryl or a substituted or non-substituted alkyl group.

Examples of alkyl sulfonic acids are methanesulfonic acid (or mesylic acid) and ethanesulfonic acid (or esylic acid).

Examples of aryl sulfonic acid are benzenesulfonic acid (or besylic acid), para-toluene sulfonic acid (or tosylic acid), trifluoromethanesulfonic acid (or triflic acid), and polystyrene sulfonic acid (sulfonated polystyrene).

In a more preferred embodiment, the thermally cleavable agents (TCA) are dicarboxylic acids with the formula HOOC—$X_a$—COOH, wherein a is 0 or 1 and X is an optionally substituted $C_1$-$C_3$ alkylene group, i.e. methylene, ethylene, n-propylene or i-propylene group. The $C_1$-$C_3$ alkylene group may be linear or branched.

In an another more preferred embodiment, the TCA has the formula HOOC—$(CH_2)_b$—COOH, wherein b is 0, 1, 2 or 3.

In an even more preferred embodiment, the dicarboxylic acid is oxalic acid (b=0), malonic acid (b=1), succinic acid (b=2) or glutaric acid (b=3).

In a most preferred embodiment, the dicarboxylic acid is oxalic acid (b=0).

In another preferred embodiment, the thermally cleavable agent selected from the class of aliphatic monocarboxylic acids is the glyoxylic acid.

The thermally cleavable agent (TCA) preferably has a solubility in the optional dispersion medium of preferably at least 0.1 wt %, more preferably at least 1 wt %, most preferably of at least 2.5 wt % in the optional dispersion medium.

The thermally cleavable agent is incorporated without further preparation to the metallic nanoparticles dispersion or dissolved in a co-solvent when the thermally cleavable agent is not directly soluble in the dispersion medium. The co-solvent is miscible with the dispersion medium.

6. Preparation of the Metallic Nanoparticles Dispersion

Nanoparticles dispersions are prepared by dispersing the metal(s), the metal oxide(s) or the metal precursor(s) in the presence of the polymeric dispersant and the optional dispersion medium. Dispersing methods include precipitating, mixing or milling or a combination thereof. The experimental conditions such as temperature, process time, energy input, etc. depend on the methodology chosen. The dispersion process can be carried out in a continuous, batch or semi-batch mode.

Mixing apparatuses may include a pressure kneader, an open kneader, a planetary mixer, a dissolver, a high shear stand mixer, and a Dalton Universal Mixer. Suitable milling and dispersion apparatuses are a ball mill, a pearl mill, a colloid mill, a high-speed disperser, double rollers, a bead mill, a paint conditioner, and triple rollers. Many different types of materials may be used as milling media, such as glasses, ceramics, metals, and plastics. The dispersions may also be prepared using ultrasonic energy.

The term "nanoparticles" refers to dispersed particles having an average particle size below 100 nm at the end of the dispersion preparation. Before the dispersion preparation step, the metallic, metal precursor or metal oxide particles are typically available as powders, flakes, particles or aggregated particles. When their average size is above 100 nm, the dispersion step includes necessarily a down-sizing step including the actions of milling or de-aggregating until the particles size is lowered to the nanoparticles range. The conversion of metal precursor(s) or metal oxide(s) to metal(s) can be concomitant to the down-sizing step.

In a preferred embodiment, the nanoparticles dispersions of the present invention are prepared by an in-situ reduction under mixing of a metal precursor, a metal oxide, a metal salt or a combination thereof, in the presence of a reducing agent and the polymeric dispersant according a preferred embodiment of the present invention in the liquid vehicle.

In a preferred embodiment, the dispersion is a low viscous liquid comprising at least 1 wt. %, more preferably at least 5 wt. %, of metallic, metal oxide or metal precursor nanoparticles.

The weight ratio nanoparticles/polymeric dispersant is at least 1.0, more preferably between 3.0 and 9.0.

In another preferred embodiment, the dispersion is substantially solvent-free, i.e. less than 10 wt. %, preferably less than 5 wt. % of solvent. Such a substantially solvent-free dispersion is obtained as a high viscous homogenous paste after evaporation of the dispersion medium. The solvent-free dispersion preferably comprises between 50 and 90 wt. % of metal, metal oxide or metal precursor nanoparticles. More preferably, the solvent-free dispersion comprises at least 75 wt. % of nanoparticles.

The high viscous paste can be re-dispersed in water, in an organic solvent, or in a combination thereof resulting in a low viscous dispersion which can then be used as for example a printing fluid. The re-dispersing step may be carried out by magnetic or mechanical stirring or by mixing. In the re-dispersion step the mixing apparatuses described above may be used. The size of the nanoparticles does not vary during the re-dispersing step. Realizing a stable high viscous paste that can be re-dispersed is an advantage for storing and transporting. In addition, the high viscous paste can be re-dispersed in a variety of solvents, even water, resulting in an increased flexibility to choose the optimal solvent for a particular application.

Preferred nanoparticles comprise metallic silver, copper or aluminium and particularly preferred nanoparticles comprise metallic silver oxide. These particularly preferred nanoparticles may be prepared, for example, by the reduction of silver precursors or salts or a combination thereof by a reducing agent, in the presence of the polymeric dispersant (PD). Particularly preferred silver salts or silver precursors are silver oxide and silver acetate.

Preferred embodiments of the present invention relate to a dispersion comprising (a) a dispersion comprising metallic, metal oxide or metal precursor nanoparticles, (b) a polymeric dispersant comprising (i) a polyacetal or a polyacetal/polyether backbone, and (ii) an anchor group with affinity for the metallic, metal oxide or metal precursor nanoparticles that is chemically bonded to the polyacetal or polyacetal/polyether backbone, the PD having 95 wt % decomposition at a temperature below 300° C., (c) an optional dispersion medium, and (d) a thermally cleavable agent (TCA) characterized in that the TCA is a Brönsted acid having a pKa below 4.4 and a boiling point of 100° C. or higher, preferably of 110° C. or higher, and i) the TCA is an aliphatic carboxylic acid, according to the formula R—[COOH]n, where R is either absent or an optionally substituted alkyl or alkylene group and n is an integer equal or higher than 1, or ii) the TCA is a sulphonic acid, according to the formula R'—$SO_3H$ wherein R' is an optionally substituted alkyl or aryl group.

In more preferred embodiment of the invention, the TCA comprised in the dispersion is a carboxylic acid according to the formula R—[COOH]n, where R is either absent, or is an optionally substituted alkyl, and n is 1, 2 or 3.

In another more preferred embodiment of the invention, the TCA comprised in the dispersion is a dicarboxylic acid according to the formula HOOC—$X_a$—COOH, wherein a is 0 or 1 and X is an optionally substituted $C_1$-$C_3$ alkylene group.

In an even more preferred embodiment of the invention the TCA comprised in the dispersion is a dicarboxylic acid according to the formula HOOC—$(CH_2)_b$—COOH, wherein b is 0, 1, 2 or 3.

In a most preferred embodiment of the invention, the TCA is oxalic acid.

In another most preferred embodiment of the invention, the TCA is a glyoxylic acid or derivatives thereof.

In another most preferred embodiment of the invention, the TCA is citric acid, propane tricarboxylic acid or derivatives thereof.

The dispersions according to a preferred embodiment the present invention are prepared by adding a thermally cleavable agent to the metallic nanodispersion as described above by a process comprising the following steps:

(a) providing a dispersion comprising (i) metallic, metal oxide or metal precursor nanoparticles, (ii) a polymeric dispersant comprising a polyacetal or a polyacetal/polyether backbone and an anchor group with affinity for the metallic, metal oxide or metal precursor nanoparticles that is chemically bonded to the polyacetal of polyacetal/polyether backbone having 95 wt. % decomposition at a temperature below 300° C., and (iii) a dispersion medium, and (b) adding a thermally cleavable agent (TCA) characterized in that the TCA is a Brönsted acid having a pKa below 4.4 and whose boiling point is equal of above 100° C., preferably equal or above 110° C. wherein the TCA is:

i) an aliphatic carboxylic acid, according to the formula R—[COOH]n, where R is either absent or an optionally substituted alkyl or alkylene group and n is an integer equal or higher than 1, or ii) a sulphonic acid, according to the formula R'—$SO_3H$ wherein R' is an optionally substituted alkyl or aryl group.

The thermally cleavable agent (TCA) may be directly added to the metallic nanoparticles dispersion (MNPD) as a powder or as a solution in 1-methoxy-2-propanol (MOP), ethanol or methanol.

The preparation of metallic, metal oxide or metal precursor non-aqueous nanodispersion is done by the addition of thermally cleavable agent to the metallic, metal oxide or metal precursor nanoparticles dispersion by using a homogenization technique such as stirring, high shear mixing, ultra-sonication, or a combination thereof. The homogenization step can be carried at elevated temperature up to 100° C.

In a preferred embodiment, the homogenization step is carried out at temperature equal or below 60° C.

For the embodiment wherein the nanoparticle dispersion is a high viscous paste, as described above, the thermally cleavable agent (TCA) is preferably added to the re-dispersed high viscous paste. Adding the thermally cleavable agent (TCA) to the high viscous paste before solvent evaporation or before re-dispersing it, may induce partial decomposition of the polymeric dispersant present in the composition. Mixing methods used to re-disperse the high viscous paste may locally increase the temperature of the dispersion and thus cooling devices are preferably used for maintaining the temperature at maximum 40° C. For this embodiment, the dispersions are preferably prepared by a process comprising the following steps:

providing a dispersion comprising (a) metallic, metal oxide or metal precursor nanoparticles, (b) a polymeric dispersant comprising (i) a polyacetal or a polyacetal/polyether backbone, and (ii) an anchor group with affinity for the metallic, metal oxide or metal precursor nanoparticles that is chemically bonded to the polyacetal or polyacetal/polyether backbone, the PD having 95 wt. % decomposition at a temperature below 300° C., and (c) a first dispersion medium, removing the dispersion medium at least partially by evaporation thereby obtaining a high viscous paste, re-dispersing the high viscous paste in a second dispersion medium, wherein the first and second dispersion medium may be the same, and adding a thermally cleavable agent (TCA) characterized in that the TCA is a Brönsted acid having a pKa below 4.4 and a boiling point above 100° C., wherein the TCA is:

i) an aliphatic carboxylic acid, according to the formula R—[COOH]n, where R is either absent or an optionally substituted alkyl or alkylene group and n is an integer equal or higher than 1, or ii) a sulphonic acid, according to the formula R'—$SO_3H$ wherein R' is an optionally substituted alkyl or aryl group.

The dispersions, according to a preferred embodiment the present invention, may be directly used as a coating solution or printing fluid. However, to optimize its coating or printing properties and depending on the application for which it is used, extra solvents and/or additives such as reducing agents, salts, wetting/levelling agents, rheology modifiers, or adhesion agents or tackifiers may be added to the low viscous nanoparticles dispersion or the re-dispersed paste after re-dispersion in a suitable solvent.

EXAMPLES

Materials

All materials used in the following examples were readily available from standard sources such as ALDRICH CHEMICAL Co. (Belgium) and ACROS (Belgium) unless otherwise specified.

Silver nitrate ($AgNO_3$) is manufactured by AGFA GEVAERT N.V. Silver oxide ($Ag_2O$) is prepared by the precipitation of silver nitrate in an alkaline aqueous solution of sodium hydroxide (33%) followed by filtration and drying. Silver oxide is commercially available from ALDRICH.

DMDT is the abbreviation for 2,5-dimercapto-1,3,4-thiadiazole.
Merazole is the abbreviation for 5-heptyl-2-mercapto-1,3,4-oxadiazole.
Tetrazole is the abbreviation for 5-mercapto-1-methyltetrazole.
DCM is dichloromethane or methylenechloride ($CH_2Cl_2$).
MOP is 1-methoxy-2-propanol.
Glyoxylic acid is the abbreviation for glyoxylic acid monohydrate.
Thermally cleavable agents (TCA):
TCA-01 is the abbreviation for oxalic acid
TCA-02 is the abbreviation for malonic acid
TCA-03 is the abbreviation for succinic acid
TCA-04 is the abbreviation for glutaric acid
TCA-05 is the abbreviation for formic acid
TCA-06 is the abbreviation for acetic acid
TCA-07 is the abbreviation for benzoic acid
TCA-08 is the abbreviation for adipic acid
TCA-09 is the abbreviation for glyoxilic acid
TCA-10 is the abbreviation for butanoic acid
TCA-11 is the abbreviation for para-toluene sulfonic acid
TCA-12 is the abbreviation for propionic acid
TCA-13 is the abbreviation for citric acid
TCA-14 is the abbreviation for propane tricarboxylic acid
TCA-15 is the abbreviation for methane sulfonic acid
TCA-16 is the abbreviation for trifluoromethane sulfonic acid
TCA-17 is the abbreviation for trimesic acid
TCA-18 is the abbreviation for trimellitic acid
TCA-19 is the abbreviation for pyromellitic acid
TCA-20 is the abbreviation for mellitic acid

Measurement Methods 1. c-TGA:

Conventional Thermogravimetric Analysis (c-TGA) of thermally cleavable polymeric dispersants and thermally cleavable blends were performed by using a TGA Q500 V6.7 instrument (Build 203). The temperature range was 25 to 500° C. at a heating rate of 10° C./min under nitrogen atmosphere. Td95 represents the measured temperature for 95% of decomposition (or at which the char yield=5%; the char yield is the residual wt % after decomposition).

2. HiRes-TGA:

High-Resolution Thermogravimetric Analysis (HiRes-TGA) of polymeric dispersants were performed by using a TGA Q500 V6.7 instrument (Build 203) with Hi-Res-Dynamic method (Hi-Res sensitivity=2.0, resolution=5.0). The temperature range was 25 to 500° C. with a maximum heating ramp of 50° C./minute. The heating rate was controlled by the evaporation rate of the sample that allowed the high resolution mode. Td95 represents the measured temperature for 95% of decomposition (or at which the char yield=5%; the char yield is the residual wt % after decomposition).

3. Gel Permeation Chromatography (GPC)

The number-average (Mn) molecular weight, the z-average (Mz) molecular weight and the molecular weight at peak maximum (Mp) of the thermally cleavable polymeric dispersants and of the thermally cleavable blends were measured by size exclusion chromatography using dimethyl acetamide/0.21 wt. % LiCl/0.63 wt. % acetic acid as an eluent and 3 mixed-B columns which were calibrated against linear polystyrene standards.

Stable thermally polymeric dispersants or thermally cleavable blends have a decrease in both Mn and Mp of less than 10%.

Example 1

Preparation of the Polymeric Dispersants PD-01 to PD-07

This example illustrates the preparation of several polymeric dispersants of different compositions by using different anchoring groups.

Dispersant PD-01 (3.8 mol % DMDT)

920 g of 1,3-dioxolane were dissolved in 938 g of DCM in a 3 L three-neck round-bottom flask and stirred at room temperature under nitrogen atmosphere. 74.6 g of DMDT and 10 g of n-decane were added to the flask. After 10 minutes of constant stirring, 2.3 g of trifluoromethanesulfonic acid were added to the reaction mixture and stirred for 6 hours at 23° C. 3.3 mL of triethylamine were added to the reaction mixture. The solvent was evaporated under reduced pressure. 821.1 g of polymeric dispersant PD-01 were recovered (yield=82.6%). Mn=4546 Mz=7529 Mw/Mn=1.29

Dispersant PD-02 (4.0 mol % Tetrazole)

75 g of 1,3-dioxolane were dissolved in 66 g of DCM in a 0.3 L three-neck round-bottom flask and stirred at room temperature under nitrogen atmosphere. 4.9 g of tetrazole and 4 g of n-decane were added to the flask. After 10 minutes of constant stirring, 0.3 g of trifluoromethanesulfonic acid were added to the reaction mixture and stirred for 4 hours at 23° C. 0.4 g of triethylamine were added to the reaction mixture. The solvent was evaporated under reduced pressure. 65.0 g of polymeric dispersant PD-02 were recovered (yield=81.4%). Mn=5670 Mz=9647 Mw/Mn=1.31

Dispersant PD-03 (5.0 mol % Tetrazole)

45 g of 1,3-dioxolane were dissolved in 40 g of DCM in a 0.2 L three-neck round-bottom flask and stirred at room temperature under nitrogen atmosphere. 3.7 g of tetrazole and 4 g of n-decane were added to the flask. After 10 minutes of constant stirring, 0.2 g of trifluoromethanesulfonic acid were added to the reaction mixture and stirred for 4 hours at 23° C. 0.25 g of triethylamine were added to the reaction mixture. The solvent was evaporated under reduced pressure. 35.7 g of polymeric dispersant PD-03 were recovered (yield=73.3%). Mn=4584 Mz=7215 Mw/Mn=1.25

Dispersant PD-04 (3.0 mol % Tetrazole)

45 g of 1,3-dioxolane were dissolved in 39 g of DCM in a 0.2 L three-neck round-bottom flask and stirred at room temperature under nitrogen atmosphere. 2.2 g of tetrazole and 4 g of n-decane were added to the flask. After 10 minutes of constant stirring, 0.2 g of trifluoromethanesulfonic acid were added to the reaction mixture and stirred for 4 hours at 23° C. 0.25 g of triethylamine were added to the reaction mixture. The solvent was evaporated under reduced pressure. 39.8 g of polymeric dispersant PD-04 were recovered (yield=84.3%).
Mn=6231 Mz=11206 Mw/Mn=1.37

Dispersant PD-05 (4.0 mol % Merazole)

75 g of 1,3-dioxolane were dissolved in 69 g of DCM in a 0.25 L three-neck round-bottom flask and stirred at room temperature under nitrogen atmosphere. 8.45 g of merazole and 4 g of n-decane were added to the flask. After 10 minutes of constant stirring, 0.3 g of trifluoromethanesulfonic acid were added to the reaction mixture and stirred for 4 hours at 23° C. 0.4 g of triethylamine were added to the reaction mixture. The solvent was evaporated under reduced pressure. 65.0 g of polymeric dispersant PD-05 were recovered (yield=72.7%). Mn=5368 Mz=9270 Mw/Mn=1.32

Dispersant PD-06 (5.0 mol % Merazole)

75 g of 1,3-dioxolane were dissolved in 71 g of DCM in a 0.3 L three-neck round-bottom flask and stirred at room temperature under nitrogen atmosphere. 10.7 g of merazole and 4 g of n-decane were added to the flask. After 10 minutes of constant stirring, 0.3 g of trifluoromethanesulfonic acid were added to the reaction mixture and stirred for 4 hours at 23° C. 0.4 g of triethylamine were added to the reaction mixture. The solvent was evaporated under reduced pressure. 74.3 g of polymeric dispersant PD-06 were recovered (yield=86.7%). Mn=4541 Mz=7186 Mw/Mn=1.26

Dispersant PD-07 (3.0 mol % Merazole)

75 g of 1,3-dioxolane were dissolved in 68 g of DCM in a 0.3 L three-neck round-bottom flask and stirred at room temperature under nitrogen atmosphere. 6.3 g of merazole and 4 g of n-decane were added to the flask. After 10 minutes of constant stirring, 0.3 g of trifluoromethanesulfonic acid were added to the reaction mixture and stirred for 4 hours at 23° C. 0.4 g of triethylamine were added to the reaction mixture. The solvent was evaporated under reduced pressure. 71.0 g of polymeric dispersant PD-07 were recovered (yield=87.3%). Mn=5992 Mz=10633 Mw/Mn=1.35

Example 2

Preparation of TCB-01 to TCB-21

This example illustrates the preparation of several blends or compositions comprising the polymeric dispersants described above and the different TCAs.

Comparative and inventive thermally cleavable blends TCB-01 to TCB-07 and TCB-09 to TCB-17 were prepared by introducing the polymeric dispersant PD-01, a thermally cleavable agent (TCA-01 to TCA-06 and TCA-08 to TCA-16) and ethanol (25/25/50 PD-01/TCA/ethanol wt %:wt %:wt %) in a 50 mL three-neck round bottom flask equipped with a thermometer and a refrigerant. The reaction mixture was homogenized by stirring at 23° C. for 1 hour. After complete homogenization, the flask was immersed in an oil batch thermostated at 130° C. for 30 minutes.

Comparative thermally cleavable blends TCB-08 and TCB-18 to TCB-21 were prepared by introducing the polymeric dispersant PD-01, a thermally cleavable agent (TCA-08 and TCA-17 to TCA-20) and ethanol (10/10/80 PD-01/TCA/ethanol wt %:wt %:wt %) in a 50 mL three-neck round bottom flask equipped with a thermometer and a refrigerant. The reaction mixture was homogenized by stirring at 23° C. for 1 hour. After complete homogenization, the flask was immersed in an oil batch thermostated at 130° C. for 30 minutes.

The composition of TCB-01 to TCB-21 is shown in Table 1.

TABLE 1

| TCB | PD | TCA | NAME | TCA/PD wt:wt |
|---|---|---|---|---|
| TCB-01 (COMP) | PD-01 | — | — | 0.0 |
| TCB-02 (INV) | PD-01 | TCA-01 | Oxalic acid | 1.0 |
| TCB-03 (INV) | PD-01 | TCA-02 | Malonic acid | 1.0 |
| TCB-04 (INV) | PD-01 | TCA-03 | Succinic acid | 1.0 |
| TCB-05 (INV) | PD-01 | TCA-04 | Glutaric acid | 1.0 |
| TCB-06 (COMP) | PD-01 | TCA-05 | Formic acid | 1.0 |
| TCB-07 (COMP) | PD-01 | TCA-06 | Acetic acid | 1.0 |
| TCB-08 (COMP) | PD-01 | TCA-07 | Benzoic acid | 1.0 |
| TCB-09 (COMP) | PD-01 | TCA-08 | Adipic acid | 1.0 |
| TCB-10 (INV) | PD-01 | TCA-09 | Glyoxilic acid | 1.0 |
| TCB-11 (COMP) | PD-01 | TCA-10 | Butanoic acid | 1.0 |
| TCB-12 (INV) | PD-01 | TCA-11 | p-toluene sulfonic acid | 1.0 |
| TCB-13 (COMP) | PD-01 | TCA-12 | Propionic acid | 1.0 |
| TCB-14 (INV) | PD-01 | TCA-13 | Citric acid | 1.0 |
| TCB-15 (INV)) | PD-01 | TCA-14 | Propane tricarboxylic acid | 1.0 |
| TCB-16 (INV) | PD-01 | TCA-15 | Methane sulfonic acid | 1.0 |
| TCB-17 (INV) | PD-01 | TCA-16 | Trifluoromethane sulfonic acid | 1.0 |
| TCB-18 (COMP) | PD-01 | TCA-17 | Trimesic acid | 1.0 |
| TCB-19 (COMP) | PD-01 | TCA-18 | Trimellitic acid | 1.0 |
| TCB-20 (COMP) | PD-01 | TCA-19 | Pyromellitic acid | 1.0 |
| TCB-21 (COMP) | PD-01 | TCA-20 | Mellitic acid | 1.0 |

Table 2 shows some of the properties of TCA-01 to TCA-20

| TCA | Product | *Boiling Point (° C.) | *$pK_a$ |
|---|---|---|---|
| TCA-01 | Oxalic Acid | Sublimes | 1.25 |
|  |  |  | 4.14 |
| TCA-02 | Malonic Acid | Decomp. | 2.83 |
|  |  |  | 5.69 |
| TCA-03 | Succinic Acid | 235 | 4.16 |
|  |  |  | 5.61 |
| TCA-04 | Glutaric Acid | 302 | 4.31 |
|  |  |  | 5.41 |
| TCA-05 | Formic acid | 101 | 3.75 |
| TCA-06 | Acetic acid | 117-118 | 4.75 |
| TCA-07 | Benzoic acid | 249 | 4.2 |
| TCA-08 | Adipic acid | 265 at 100 mmHg | 4.43 |
|  |  |  | 5.41 |
| TCA-09 | Glyoxilic acid | 111 | 3.18 |
| TCA-10 | Butanoic acid | 163.5 | 4.83 |
| TCA-11 | Para-toluene sulphonic acid | 140 at 20 mmHg | −2.8 |
| TCA-12 | Propionic acid | 141 | 4.87 |
| TCA-13 | Citric acid | 175 | 3.09 |
|  |  |  | 4.75 |
|  |  |  | 6.41 |
| TCA-14 | Propane tricarboxylic acid |  | 3.59 |
| TCA-15 | Methane sulfonic acid | 167 at 10 mm Hg | −1.9 |
| TCA-16 | Trifluoromethane sulfonic acid | 162 | −14.9 |
| TCA-17 | Trimesic acid | — | 3.12 |
|  |  |  | 3.89 |
|  |  |  | 4.70 |
| TCA-18 | Trimellitic acid | Decomp. | 2.52 |
| TCA-19 | Pyromellitic acid | — | 1.92 |
| TCA-20 | Mellitic acid | 678 | 1.40 |
|  |  |  | 2.19 |
|  |  |  | 3.31 |
|  |  |  | 4.78 |
|  |  |  | 5.89 |
|  |  |  | 6.96 |

*from Material Safety Data Sheet of suppliers.

Example 3

Stability of TCB-01 to TCB-21

This example illustrates the effect of the thermally cleavable agents on the stability of the polymeric dispersant after thermal curing at T=130° C. for 30 minutes (Table 3). The loss in Mn (% Mn Loss), loss in Mp (% Mp Loss) and the thermal decomposition rate, expressed in g·min/mol, are summarized in Table 3. The thermal decomposition rate corresponds to the loss of Mn in one minute of thermal curing at 130° C.

Thermally cleavable blends (TCB) TCB-01 to TCB-21 were prepared according to the experimental procedure described in Example 2. Samples of the thermally cleavable blends were analyzed by Gel Permeation Chromatography. Loss of Mn and Mp are expressed in % of the molecular weights Mn and Mp of the polymeric dispersant measured before the preparation of thermally cleavable blends: Mn=4546 g/mol, Mρ=5228 g/mol.

Stable thermally polymeric dispersants or thermally cleavable blends have a decrease in both Mn and Mp of less than 10%.

TABLE 3

| TCB | TCA | % Mn Loss | % Mp Loss | (1)Thermal Decomposition rate (g · min/mol) |
|---|---|---|---|---|
| TCB-01 (COMP) | No | 0 | 0 | 0 |
| TCB-02 (INV) | TCA-01 | −40 | −56 | −60.6 |
| TCB-03 (INV) | TCA-02 | −35 | −57 | −53.0 |
| TCB-04 (INV) | TCA-03 | −4 | −14 | −6.1 |
| TCB-05 (INV) | TCA-04 | −17 | −29 | −25.8 |
| TCB-06 (COMP) | TCA-05 | −2 | −2 | −3.0 |
| TCB-07 (COMP) | TCA-06 | 0 | 0 | 0 |
| TCB-08 (COMP) | TCA-07 | −3 | −3 | −2.4 |
| TCB-09 (COMP) | TCA-08 | −2 | −8 | −1.4 |
| TCB-10 (INV) | TCA-09 | −47 | −63 | −71.2 |
| TCB-11 (COMP) | TCA-10 | 0 | 0 | 0 |
| TCB-12 (INV) | TCA-11 | −52 | −63 | −75.8 |
| TCB-13 (COMP) | TCA-12 | −7 | −9 | −11.1 |
| TCB-14 (INV) | TCA-13 | −20 | −38 | −29.8 |
| TCB-15 (INV)) | TCA-14 | −19 | −41 | −29 |
| TCB-16 (INV) | TCA-15 | −53 | −68 | −81.1 |
| TCB-17 (INV) | TCA-16 | −100 | −100 | −151.5 |
| TCB-18 (COMP) | TCA-17 | 0 | 0 | 0 |
| TCB-19 (COMP) | TCA-18 | 0 | 0 | 0 |
| TCB-20 (COMP) | TCA-19 | 0 | 0 | 0 |
| TCB-21 (COMP) | TCA-20 | 0 | 0 | 0 |

(1)Thermal decomposition rate: loss of Mn in 1 minute of thermal curing at 130° C.

It is clear from Table 3, that only the thermally cleavable agents, according to preferred embodiments of the present invention, efficiently reduce the stability of the polymeric dispersants; the decomposition rate of the polymeric dispersant in the absence of thermally cleavable agent is zero. This means that the thermal decomposition rate of the polymeric dispersants is accelerated drastically when a TCA according to a preferred embodiment of the present invention is added, as demonstrated by the negative values presented in Table 3.

Therefore, only by using the dispersions according to a preferred embodiment of the present invention is it possible to obtain stable non-aqueous dispersions comprising metallic, metal oxide or metal precursors nanoparticles, the polymeric dispersant and the thermally cleavable agent, that when used to coat or print layers or patterns can be cured at lower temperature and/or for shorter time, for reducing of avoiding the organic residue of the layers or patterns.

Example 4

Preparation of TCB-22 to TCB-33

This example illustrates the preparation of several blends or compositions comprising the polymeric dispersants described above with TCA-01 and without TCA. Such blends can be used in the formulation of metallic, metal oxide or metal precursor nanoparticles dispersions, inks and fluids.

TCB-22 to TCB-33 were prepared by mixing the polymeric dispersants PD-02 to PD-07 and the thermally cleavable agent TCA-01 followed by a homogenization step at 50° C. for 60 minutes.

The composition of the thermally cleavable blends TCB-22 to TCB-33 is summarized in Table 4.

TABLE 4

| TCB | PD | TCA | TCA/PD wt:wt |
|---|---|---|---|
| TCB-22 (COMP) | PD-02 | — | 0.0 |
| TCB-23 (INV) | PD-02 | TCA-01 | 1.0 |
| TCB-24 (COMP) | PD-03 | — | 0.0 |
| TCB-25 (INV) | PD-03 | TCA-01 | 1.0 |
| TCB-26 (COMP) | PD-04 | — | 0.0 |
| TCB-27 (INV) | PD-04 | TCA-01 | 1.0 |
| TCB-28 (COMP) | PD-05 | — | 0.0 |
| TCB-29 (INV) | PD-05 | TCA-01 | 1.0 |
| TCB-30 (COMP) | PD-06 | — | 0.0 |
| TCB-31 (INV) | PD-06 | TCA-01 | 1.0 |
| TCB-32 (COMP) | PD-07 | — | 0.0 |
| TCB-33 (INV) | PD-07 | TCA-01 | 1.0 |

Example 5

Stability of TCB-22 to TCB-33

This example illustrates the thermal decomposition behaviour of the TCB measured by conventional TGA (c-TGA).

c-TGA provides the weight, W(Ti), of a blend at a given temperature, Ti (° C.), during the TGA measurement.

OR(Ti) is the organic residue expressed in % of the starting sample weight at Ti (° C.) calculated according to the following formula:

$$OR(Ti) = 100 \times [W(Ti)]/Wo$$

where Wo is the initial sample weight and OR(Ti) is the organic residue.

The experiment temperatures, Ti, are 100, 130, 150, 170 and 200° C. The results are shown in Table 5.

TABLE 5

| TCB | TCA-01/PD wt:wt | OR (100° C.) | OR (130° C.) | OR (150° C.) | OR (170° C.) | OR (200° C.) |
|---|---|---|---|---|---|---|
| TCB-22 (COMP) | 0 | 99.47 | 99.37 | 99.30 | 98.95 | 79.64 |
| TCB-23 (INV) | 1.0 | 95.00 | 58.79 | 36.88 | 28.55 | 22.14 |
| TCB-24 (COMP) | 0 | 99.98 | 99.77 | 99.59 | 99.23 | 95.85 |
| TCB-25 (INV) | 1.0 | 96.36 | 65.77 | 42.33 | 32.60 | 24.63 |
| TCB-26 (COMP) | 0 | 99.08 | 98.90 | 98.69 | 97.35 | 42.79 |
| TCB-27 (INV) | 1.0 | 95.43 | 59.03 | 36.80 | 28.41 | 21.75 |
| TCB-28 (COMP) | 0 | 100 | 99.88 | 99.65 | 98.98 | 96.92 |

TABLE 5-continued

| TCB | TCA-01/PD wt:wt | OR (100° C.) | OR (130° C.) | OR (150° C.) | OR (170° C.) | OR (200° C.) |
|---|---|---|---|---|---|---|
| TCB-29 (INV) | 1.0 | 92.04 | 65.10 | 44.22 | 32.12 | 23.72 |
| TCB-30 (COMP) | 0 | 100 | 99.84 | 99.60 | 98.96 | 96.81 |
| TCB-31 (INV) | 1.0 | 93.93 | 66.54 | 45.95 | 33.45 | 25.18 |
| TCB-32 (COMP) | 0 | 99.61 | 99.47 | 99.21 | 98.42 | 95.41 |
| TCB-33 (INV) | 1.0 | 95.26 | 66.93 | 45.28 | 32.89 | 22.98 |

It is clear from Table 5, that only thermally cleavable blends comprising the thermally cleavable additive, according to a preferred embodiment of the present invention, can efficiently accelerate the decomposition of the polymeric dispersant at temperature below or equal to 200° C. Only dispersions comprising a TCA according to a preferred embodiment of the present invention show reduction of their weight at a given temperature. This weight reduction, due to decomposition of the polymeric dispersant, is increased with the temperature raising.

Furthermore, it is also clear that the effect is independent of the nature of the anchoring group of the polymeric dispersant and of its composition: tetrazole was used in the PD-02, PD-03 and PD-04 whilst merazole was used in PD-05, PD-06 and PD-07 but all the mentioned polymeric dispersions were able to decompose.

Thus, only patterns or layers prepared from inks or fluids comprising the blends of the preferred embodiments of the present invention can be efficiently cured at a temperature below 200° C. and exhibit less organic residue.

Example 6

Preparation of MNPD-01

125 g of silver oxide and 29.1 g of PD-01 in 2765 g of MOP (grey suspension) was stirred for 30 minutes at 40° C. in a 5 L reactor equipped with a thermometer and a mechanical stirrer. 30.5 mL of formic acid was added to the reaction mixture at 40° C. by using an automated syringe (flow=420 mL/min). After complete addition of the formic acid, the reaction mixture was further stirred at 40° C. for two additional hours, allowing the complete evaporation of residual formic acid. 2.9 kg of metallic nanodispersion MNPD-01 were produced with a composition Ag/PD-01 of 80/20 wt/wt.

Example 7

Preparation of Non-Aqueous Metallic Nanodispersions CI-01 to CI-03

The metallic nanodispersion MNPD-01 was used as a comparative nanodispersion CI-01. The inventive nanodispersions CI-02 and CI-03 were prepared by the addition of TCA-01 or TCA-02 to MNPD-01 under constant stirring by using the proportions as indicated in Table 6.

TABLE 6

| CI | MNDP | Ag wt % | TCA | TCA/PD wt:wt |
|---|---|---|---|---|
| CI-01 (COMP) | MNPD-01 | 4.0 | — | 0.0 |
| CI-02 (INV) | MNPD-01 | 4.0 | TCA-01 | 1.0 |
| CI-03 (INV) | MNPD-01 | 4.0 | TCA-02 | 1.0 |

Example 8

Thermal decomposition of CI-01 to CI-03

This example illustrates the thermal decomposition behaviour of the comparative and inventive metallic nanodispersions CI-01 to CI-03 measured by Hi-Res TGA.

Hi-Res TGA provides the mass, W(Ti), of dispersion at a given temperature, Ti (° C.), during the measurement.

The organic residue left in the metallic nanodispersion, OR(Ti), is expressed in % of the initial sample weight and is calculated according to the following formula:

$$OR(Ti) = 100 \times [W(Ti) - WAg]/[Wo - WAg],$$

wherein Wo is the initial sample weight, and
WAg the weight of silver in the composition.

Table 7 shows the results.

TABLE 7

| CI | OR (100° C.) | OR (130° C.) | OR (150° C.) | OR (170° C.) |
|---|---|---|---|---|
| CI-01 (COMP) | 0.84 | 0.83 | 0.80 | 0.75 |
| CI-02 (INV) | 0.33 | 0.20 | 0.18 | 0.16 |
| CI-03 (INV) | 1.26 | 1.05 | 0.68 | 0.37 |

It is clear from Table 7, that only the metallic nanodispersions that comprise a polymeric dispersant and a thermally cleavable agent or a thermally cleavable blend of preferred embodiments of the present invention can be efficiently cured at temperatures below 200° C.: only the dispersions comprising a TCA according to preferred embodiments of the present invention decompose at a given temperature.

Thus, non-aqueous nanodispersions according to preferred embodiments of the present invention are able to produce coated or printed metallic patterns or layers of very low organic residue. In the absence of TCA, higher organic residue is observed at a given temperature.

Example 9

This example illustrates the effect of the thermally cleavable additives on the shelf-life of the polymeric dispersant when no thermal curing is applied. The shelf-life of a polymeric dispersant according to a preferred embodiment of the present invention, in the presence of thermally cleavable additives TCA-01, TCA-09, TCA-11, TCA-14 and TCA-15 was evaluated by Gel Permeation Chromatography.

TCB-34 to TCB-38 were prepared by stirring the polymeric dispersant PD-01, a thermally cleavable additive (TCA-01, TCA-09, TCA-11, TCA-14 or TCA-15) and ethanol in the proportion 25/25/50 PD-01/TCA/ethanol wt %:wt %:wt %. Samples of the thermally cleavable blends were analyzed by Gel Permeation Chromatography after 20 hours of stirring at 23° C. The number-average molecular weight, Mn, of the polymeric dispersant PD-01 measured before the preparation of thermally cleavable blends is Mn=4546 g/mol.

The loss in Mn (% Mn Loss) and the thermal decomposition rate, expressed in g·day/mol, are summarized in Table 8. The thermal decomposition rate corresponds to the loss of Mn in one day of storage at 23° C.

TABLE 8

| TCB | TCA | % Mn Loss | Thermal Decomposition rate (g · day/mol) |
|---|---|---|---|
| TCB-34 | TCA-01 | −3 | −170 |
| TCB-35 | TCA-11 | −43 | −2359 |
| TCB-36 | TCA-09 | 0 | 0 |
| TCB-37 | TCA-15 | −53 | −2898 |
| TCB-38 | TCA-14 | 0 | 0 |

It is clear from Table 8, that only certain thermally cleavable additives according to preferred embodiments of the present invention can be used in metallic nanoparticles dispersions or in compositions comprising the polymeric dispersant, without reducing its shelf-life since no losses due to decomposition are observed.

In this sense, it is clear that carboxylic acids are preferred and that the effect observed with TCA-01 (a dicarboxylic acid), TCA-09 (a monocarboxylic acid) and TCA-14 (a tricarboxylic acid) is also valid for TCA's of preferred embodiments of the present invention having a pKa below 4.4.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A dispersion comprising:
metallic nanoparticles, metal oxide nanoparticles, or metal precursor nanoparticles;
a polymeric dispersant including (i) a polyacetal or a polyacetal/polyether backbone, and (ii) an anchor group with an affinity for the metallic nanoparticles, the metal oxide nanoparticles, or the metal precursor nanoparticles that is chemically bonded to the polyacetal or polyacetal/polyether backbone, the polymeric dispersant having 95 wt. % decomposition at a temperature below 300° C.;
an optional dispersion medium; and
a thermally cleavable agent; wherein
the thermally cleavable agent is a Brönsted acid having a pKa below 4.4 and a boiling point of 100° C. or higher; and
the thermally cleavable agent is an aliphatic carboxylic acid according to the formula R—[COOH]n, wherein R is either absent or an optionally substituted alkyl or alkylene group and n is an integer equal or higher than 1; or
the thermally cleavable agent is a sulphonic acid according to the formula R'—SO$_3$H, wherein R' is an optionally substituted alkyl or aryl group; and
wherein the anchor group of the polymeric dispersant is represented by Formulae II, III, IV, or V,

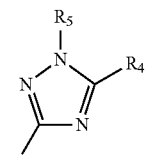

Formula II

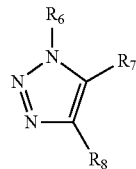

Formula III

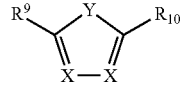

Formula IV

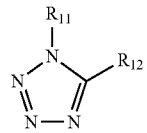

Formula V wherein $R_3$, $R_4$, $R_7$, $R_8$, $R_9$, $R_{10}$, and $R_{12}$ independently represent a halogen, an optionally substituted thiol, a hydroxyl, a carboxylic acid, an aldehyde, an ester, an amide, a primary amine, a secondary amine, a tertiary amine, or an optionally substituted alkyl, aryl, aralkyl, or alkylene group;

$R_7$ and $R_8$ is optionally linked and form a ring structure;

$R_5$, $R_6$, $R_{11}$ independently represent a halogen, an optionally substituted thiol, a carboxylic acid, a primary amine, a secondary amine, a tertiary amine, or an optionally substituted alkyl, aryl, or aralkyl group;

X independently represents a —N—, a —CH—, or a —C(CR$_{13}$)— and wherein $R_{13}$ represents a methyl, an optionally substituted alkyl, aryl, or aralkyl group and where X is optionally linked to $R_9$ or $R_{10}$ and form a ring structure; and Y represents oxygen, sulphur, or —NR$_{14}$—, wherein $R_{14}$ represents a methyl, or an optionally substituted alkyl, aryl, or aralkyl group.

2. The dispersion according to claim 1, wherein the thermally cleavable agent is an aliphatic carboxylic acid according to the formula R—[COOH]n, wherein R is either absent or an optionally substituted alkyl or alkylene group and n is 1, 2, or 3.

3. The dispersion according to claim 1, wherein the thermally cleavable agent is a dicarboxylic acid according to the formula HOOC—X$_a$—COOH, wherein a is 0 or 1 and X is an optionally substituted C$_1$-C$_3$ alkylene group.

4. The dispersion according to claim 1, wherein the thermally cleavable agent is a dicarboxylic acid according to the formula HOOC—(CH$_2$)$_b$—COOH, wherein b is 0, 1, 2, or 3.

5. The dispersion according to claim 1, wherein the thermally cleavable agent is selected from the group consisting of oxalic acid, malonic acid, succinic acid, glutaric acid, glyoxylic acid, citric acid propane tricarboxylic acid, and derivatives thereof.

6. The dispersion according to claim 1, wherein the polyacetal or polyacetal/polyether backbone of the polymeric dispersant is an aliphatic polyacetal or polyacetal/polyether selected from:

—$(CH_2-O)_n$—
—$(CH_2-CH_2-O-CH_2-O)_n$—
—$(CH_2-CH_2-CH_2-O-CH_2-O)_n$—
—$(CH_2-CH_2-CH_2-CH_2-O-CH_2-O)_n$—
—$(CH_2-CH_2-O)_n$—
—$(CH_2-CHCH_3-O)_n$—
—$(CH_2-CH_2-CH_2-O)_n$—
—$(CH_2-CH_2-CH_2-CH_2-O)_n$—
—$(CH_2-CH_2-CH_2-CH_2-CH_2-O)_n$—
—$(CH_2-CH_2-CH_2-CH_2-CH_2-CH_2-O)_n$— wherein n is an integer between 14 and 500.

7. The dispersion according to claim 1, wherein the polyacetal or polyacetal/polyether backbone of the polymeric dispersant is represented by Formula I:

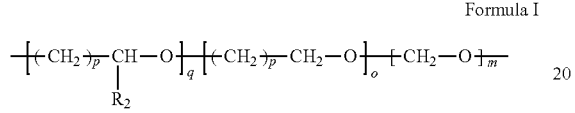

Formula I wherein
m is an integer between 1 and 500;
o is an integer between 0 and 340;
q is an integer between 0 and 250;
p is an integer between 1 and 7;
m+o+q is an integer between 14 and 500; and
$R_2$ represents a hydrogen, a methyl, or an optionally substituted alkyl group.

8. The dispersion according to claim 1, wherein an average numerical molecular weight of the polymeric dispersant is between 1500 and 6000 Da.

9. The dispersion according to claim 1, further comprising at least 1 wt % of the metallic nanoparticles, the metal oxide nanoparticles, or the metal precursor nanoparticles.

10. A method of preparing a layer or pattern comprising printing the dispersion as defined in claim 1 on a substrate.

11. A method of preparing a dispersion, comprising the steps of:
a) providing a dispersion including:
metallic nanoparticles, metal oxide nanoparticles, or metal precursor nanoparticles;
a polymeric dispersant including (i) a polyacetal or a polyacetal/polyether backbone, and (ii) an anchor group having an affinity for the metallic, metal oxide, or metal precursor nanoparticles that is chemically bonded to the polyacetal or polyacetal/polyether backbone, the polymeric dispersant having 95 wt. % decomposition at a temperature below 300° C.; and
a dispersion medium; and
b) adding a thermally cleavable agent; wherein
the thermally cleavable agent is a Brönsted acid having a pKa below 4.4 and a boiling point of 100° C. or higher; and
the thermally cleavable agent is an aliphatic carboxylic acid according to the formula R—[COOH]n, wherein R is either absent or an optionally substituted alkyl or alkylene group and n is an integer equal or higher than 1; or
the thermally cleavable agent is a sulphonic acid according to the formula R'—$SO_3H$, wherein R' is an optionally substituted alkyl or aryl group; and
wherein the anchor group of the polymeric dispersant is represented by Formulae II, III, IV, or V,

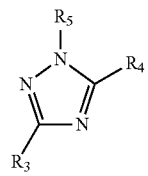

Formula II

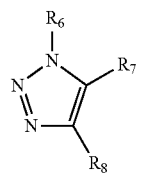

Formula III

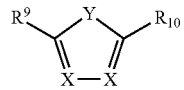

Formula IV

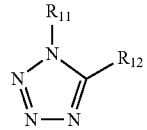

Formula V wherein $R_3$, $R_4$, $R_7$, $R_8$, $R_9$, $R_{10}$, and $R_{12}$ independently represent a halogen, an optionally substituted thiol, a hydroxyl, a carboxylic acid, an aldehyde, an ester, an amide, a primary amine, a secondary amine, a tertiary amine, or an optionally substituted alkyl, aryl, aralkyl, or alkylene group;
$R_7$ and $R_8$ is optionally linked and form a ring structure;
$R_5$, $R_6$, $R_{11}$ independently represent a halogen, an optionally substituted thiol, a carboxylic acid, a primary amine, a secondary amine, a tertiary amine, or an optionally substituted alkyl, aryl, or aralkyl group;
X independently represents a —N—, a —CH—, or a —C($CR_{13}$)— and wherein $R_{13}$ represents a methyl, an optionally substituted alkyl, aryl, or aralkyl group and where X is optionally linked to $R_9$ or $R_{10}$ and form a ring structure; and
Y represents oxygen, sulphur, or —$NR_{14}$—, wherein $R_{14}$ represents a methyl, or an optionally substituted alkyl, aryl, or aralkyl group.

12. The method for preparing a dispersion according to claim 11, wherein in step a) a first dispersion medium is used, and further comprising the following steps between step a) and b):
removing the first dispersion medium at least partially so as to obtain a high viscous paste; and
re-dispersing the high viscous paste in a second dispersion medium; wherein
the first and second dispersion mediums are the same.

* * * * *